United States Patent
Casati et al.

(10) Patent No.: US 10,766,997 B2
(45) Date of Patent: *Sep. 8, 2020

(54) POLYETHER POLYOL COMPOSITIONS

(71) Applicant: Dow Global Technologies LLC, Midland, MI (US)

(72) Inventors: Francois M. Casati, Horgen (CH); Irena Amici-Kroutilova, Horgen (CH); Paul Cookson, Horgen (CH); Hamideh Ahmadloo, Horgen (CH); Alberto Lora Lamia, Horgen (CH)

(73) Assignee: Dow Global Technologies LLC, Midland, MI (US)

( * ) Notice: Subject to any disclaimer, the term of this patent is extended or adjusted under 35 U.S.C. 154(b) by 70 days.

This patent is subject to a terminal disclaimer.

(21) Appl. No.: 15/563,021

(22) PCT Filed: Mar. 30, 2016

(86) PCT No.: PCT/US2016/024831
§ 371 (c)(1),
(2) Date: Sep. 29, 2017

(87) PCT Pub. No.: WO2016/160874
PCT Pub. Date: Oct. 6, 2016

(65) Prior Publication Data
US 2018/0371150 A1 Dec. 27, 2018

Related U.S. Application Data

(60) Provisional application No. 62/140,632, filed on Mar. 31, 2015.

(51) Int. Cl.
*C08G 18/48* (2006.01)
*C08G 18/16* (2006.01)
*C08G 18/24* (2006.01)
*C08G 18/20* (2006.01)
*C08G 18/18* (2006.01)
*C08G 18/76* (2006.01)
*C08G 18/73* (2006.01)
*C08G 101/00* (2006.01)

(52) U.S. Cl.
CPC ....... *C08G 18/4816* (2013.01); *C08G 18/165* (2013.01); *C08G 18/1825* (2013.01); *C08G 18/1833* (2013.01); *C08G 18/2063* (2013.01); *C08G 18/2081* (2013.01); *C08G 18/244* (2013.01); *C08G 18/485* (2013.01); *C08G 18/4829* (2013.01); *C08G 18/4837* (2013.01); *C08G 18/73* (2013.01); *C08G 18/76* (2013.01); *C08G 18/7664* (2013.01); *C08G 2101/005* (2013.01); *C08G 2101/0016* (2013.01); *C08G 2101/0058* (2013.01); *C08G 2101/0083* (2013.01); *C08L 2205/025* (2013.01)

(58) Field of Classification Search
CPC .............. C08G 18/165; C08G 18/1825; C08G 18/1833; C08G 18/2063; C08G 18/2081; C08G 18/244; C08G 18/4816; C08G 18/4829; C08G 18/4837; C08G 18/485; C08G 18/73; C08G 18/76; C08G 18/7664; C08G 2101/0016; C08G 2101/005; C08G 2101/0058; C08G 2101/0083; C08G 2202/025
See application file for complete search history.

(56) References Cited

U.S. PATENT DOCUMENTS

| | | | | |
|---|---|---|---|---|
| 5,565,498 A | * | 10/1996 | Chaffanjon | ........ C08G 18/4837 521/125 |
| 5,596,059 A | * | 1/1997 | Hager | ................. C08G 18/4883 527/300 |
| 6,410,609 B1 | | 6/2002 | Taylor et al. | |
| 9,029,432 B2 | * | 5/2015 | Aou et al. | ............. C08G 18/283 521/174 |
| 9,376,526 B2 | | 6/2016 | Hager et al. | |
| 9,751,284 B2 | * | 9/2017 | Cavalca | .............. C08G 18/4837 |
| 2007/0282029 A1 | | 12/2007 | Hager et al. | |
| 2009/0215918 A1 | * | 8/2009 | Sasaki | .................. C08G 18/283 521/174 |

(Continued)

FOREIGN PATENT DOCUMENTS

| | | |
|---|---|---|
| JP | 2010144074 | 7/2010 |
| JP | 2015004011 | 1/2015 |

(Continued)

OTHER PUBLICATIONS

International Preliminary Report on Patentability for related PCT Application PCT/US2016/024831, dated Oct. 12, 2017 (6 pgs).

(Continued)

*Primary Examiner* — John M Cooney
(74) *Attorney, Agent, or Firm* — Brooks, Cameron & Huebsch, PLLC

(57) ABSTRACT

Embodiments of the present disclosure are directed towards polyether polyol compositions that can be utilized to form semi-rigid foams. As an example, a polyether polyol composition can include a first polyether polyol having an average nominal hydroxyl functionality from 2 to 4 and a number average equivalent weight from 120 to 1500, a second polyether polyol having a having an average nominal hydroxyl functionality from 4 to 8 and a number average equivalent weight from 120 to 800, and a third polyether polyol having an average nominal hydroxyl functionality from 2 to 4 a number average equivalent weight from 200 to 500.

2 Claims, No Drawings

(56) References Cited

U.S. PATENT DOCUMENTS

| | | | |
|---|---|---|---|
| 2009/0313909 A1 | 12/2009 | Clatty et al. | |
| 2013/0079429 A1* | 3/2013 | Hager | C08L 75/08 |
| | | | 521/123 |
| 2013/0209778 A1 | 8/2013 | Albach et al. | |
| 2013/0289150 A1 | 10/2013 | Hager et al. | |

FOREIGN PATENT DOCUMENTS

| | | | |
|---|---|---|---|
| JP | 2015502428 | 1/2015 | |
| WO | WO-2012050671 A1 * | 4/2012 | ......... C08G 18/3206 |
| WO | WO-2014011375 A1 * | 1/2014 | ......... C08G 18/4837 |

OTHER PUBLICATIONS

International Search Report & Written Opinion for related PCT Application PCT/US2016/024831, dated Sep. 28, 2016 (9 pgs).

* cited by examiner

POLYETHER POLYOL COMPOSITIONS

This application is a National Stage Application under 35 U.S.C. § 371 of International Application Number PCT/US2016/024831, filed Mar. 30, 2016 and published as WO 2016/160874 on Oct. 6, 2016, which claims the benefit to U.S. Provisional Application 62/140,632, filed Mar. 31, 2015, the entire contents of which are incorporated herein by reference in its entirety.

FIELD OF DISCLOSURE

Embodiments of the present disclosure are directed towards polyether polyol compositions, more specifically, embodiments are directed towards polyether polyol compositions that can be utilized to form semi-rigid foams.

BACKGROUND

Foams are dispersions in which a gas is dispersed in a liquid material, a solid material, or a gel material. Foams can be formed by a chemical reaction of polyols and isocyanate. Foams can be utilized for a number of various applications, including bedding, furniture, vehicle seating, and carpet backing, among others.

SUMMARY

The present disclosure provides polyether polyol compositions including a first polyether polyol having an average nominal hydroxyl functionality from 2 to 4 and a number average equivalent weight from 120 to 1500, wherein the first polyether polyol includes polymer chain having from 0 weight percent to 15 weight percent of constitutional units derived from ethylene oxide and 85 weight percent to 100 weight percent of constitutional units derived from propylene oxide, a second polyether polyol having a having an average nominal hydroxyl functionality from 4 to 8 and a number average equivalent weight from 120 to 800, wherein the second polyether polyol includes a polypropylene oxide polymer chain, and a third polyether polyol having an average nominal hydroxyl functionality from 2 to 4 a number average equivalent weight from 200 to 500, wherein the third polyether polyol includes a polymer chain having from 40 weight percent to 85 weight percent of constitutional units derived from ethylene oxide and 15 weight percent to 60 weight percent of constitutional units derived from propylene oxide, where the polyether polyol composition is from 20 weight percent to 50 weight percent of constitutional units derived from ethylene oxide, the polyether polyol composition has a total average nominal hydroxyl functionality from 3.05 to 4.1, and the polyether polyol composition has a total number average equivalent weight from 250 to 400.

The present disclosure provides a semi-rigid foam formulation including the polyether polyol composition and an isocyanate, with the provisio that the isocyanate is not toluene diisocyanate.

The present disclosure provides semi-rigid foams formed by curing the semi-rigid foam formulations.

The present disclosure provides methods of forming a semi-rigid foam including combining the polyether polyol composition with an isocyanate to form a semi-rigid foam formulation and curing the semi-rigid foam formulation.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION

Polyether polyol compositions, semi-rigid foam formulations including the polyether polyol compositions, and semi-rigid foams formed therefrom are disclosed herein. Polyols, e.g., the polyether polyol compositions disclosed herein, can be combined with isocyanates to form semi-rigid foam formulations. The semi-rigid foam formulations can be cured to form semi-rigid foams, which may be referred to as polyurethanes. Polyurethanes are polymers including chains of units joined by carbamate links, which may be referred to as urethane links.

As mentioned the semi-rigid foam formulations disclosed herein may be utilized to form semi-rigid foams. These semi-rigid foams can have properties that are desirable for various applications. For example and in contrast to previous semi-rigid foams, the semi-rigid foams disclosed herein have a number of viscoelastic properties. For instance, the semi-rigid foams disclosed herein can have a density from 35 kg/m$^3$ to 80 kg/m$^3$, a resiliency from 2 percent to 20 percent, a 95% recovery time between 3 and 200 seconds, and/or a compression load deflection at 40% of from 3.5 kilopascals to 30.0 kilopascals as measured according to ISO 3386, with the proviso that hardness is measured during a first cycle. Surprisingly, the semi-rigid foam formulations, which include the polyether polyol compositions disclosed herein can be utilized to provide semi-rigid foams having the density, resiliency, recovery time, and compression load deflection mentioned, while simultaneously providing a number of other desirable properties.

Polyether polyol compositions are disclosed herein. As used herein, "polyol" refers to an organic molecule, e.g., polyether, having an average of greater than 1.0 hydroxyl groups per molecule.

The polyether polyol compositions disclosed herein can include a first polyether polyol. The first polyether polyol can include one or more polyols, e.g., the first polyether polyol may be a blend of polyols. The first polyether polyol can have an average nominal hydroxyl functionality from 2 to 4. As used herein, "average nominal hydroxyl functionality" refers to a number average functionality, e.g., a number of hydroxyl groups per molecule, of a polyol or a polyol composition based upon a number average functionality, e.g., a number of active hydrogen atoms per molecule, of initiator(s) used for preparation. As used herein, "average" refers to number average unless indicated otherwise.

The first polyether polyol can have a number average equivalent weight from 120 to 1500. All individual values and subranges from 120 to 1500 are included; for example, the first polyether polyol can have a number average equivalent weight from a lower limit of 120, 130, or 140 to an upper limit of 1500, 1450, or 1400. Some embodiments of the present disclosure provide that the first polyether polyol is nominally a triol.

Embodiments of the present disclosure provide that the first polyether polyol includes a polymer chain having from 0 weight percent to 15 weight percent of constitutional units derived from ethylene oxide and 85 weight percent to 100 weight percent of constitutional units derived from propylene oxide. All individual values and subranges from 0 weight percent to 15 weight percent of constitutional units derived from ethylene oxide are included; for example, the first polyether polyol can include a polymer having from a lower limit of 0 weight percent, 3 weight percent, or 5 weight percent to an upper limit of 15 weight percent, 12 weight percent, or 10 weight percent of constitutional units derived from ethylene oxide. Correspondently, all individual values and subranges from 85 weight percent to 100 weight percent of constitutional units derived from propylene oxide are included; for example, the first polyether polyol can include a polymer chain having from a lower limit of 85 weight percent, 87 weight percent, or 90 weight percent to an upper limit of 100 weight percent, 97 weight percent, or 95 weight percent of constitutional units derived from propylene oxide.

The polyether polyol compositions disclosed herein can include a second polyether polyol. The second polyether polyol can include one or more polyols, e.g., the second polyether polyol may be a blend of polyols. The second polyether polyol can have an average nominal hydroxyl functionality from 4 to 8. Some embodiments of the present disclosure provide that the nominal functionality of the second polyether polyol is 4.7. The second polyether polyol can have a number average equivalent weight from 120 to 800. All individual values and subranges from 120 to 800 are included; for example, the second polyether polyol can have number average equivalent weight from a lower limit of 120, 135, or 150 to an upper limit of 800, 750, or 700. The second polyether polyol can include a polypropylene oxide polymer chain.

The polyether polyol compositions disclosed herein can include a third polyether polyol. The third polyether polyol can include one or more polyols, e.g., the third polyether polyol may be a blend of polyols. The third polyether polyol can have an average nominal hydroxyl functionality from 2 to 4. The third polyether polyol can have number average equivalent weight from 200 to 500. All individual values and subranges from 200 to 500 are included; for example, the third polyether polyol can have a number average equivalent weight from a lower limit of 200, 220, or 250 to an upper limit of 500, 470, or 450. Some embodiments of the present disclosure provide that the third polyether polyol is nominally a triol.

Embodiments of the present disclosure provide that the third polyether polyol includes a polymer chain having from 30 weight percent to 85 weight percent of constitutional units derived from ethylene oxide and 15 weight percent to 70 weight percent of constitutional units derived from propylene oxide. All individual values and subranges from 30 weight percent to 85 weight percent of constitutional units derived from ethylene oxide are included; for example, the third polyether polyol can include a polymer chain having from a lower limit of 30 weight percent, 35 weight percent, or 40 weight percent to an upper limit of 85 weight percent, 83 weight percent, or 80 weight percent of constitutional units derived from ethylene oxide. Correspondently, all individual values and subranges from 15 weight percent to 70 weight percent of constitutional units derived from propylene oxide are included; for example, the third polyether polyol can include a polymer chain having from a lower limit of 15 weight percent, 17 weight percent, or 20 weight percent to an upper limit of 70 weight percent, 65 weight percent, or 60 weight percent of constitutional units derived from propylene oxide.

Some embodiments of the present disclosure provide that the polyether polyol composition is based on a blend of polyols having different functionalities. For example, as previously mentioned, the first polyether polyol and the third polyether polyol may nominally be triols, while the nominal functionality of the second polyether polyol may be 4.7.

Some embodiments of the present disclosure provide that one or more of the polyether polyols is a mixed feed ethylene oxide and propylene oxide based polyol. For instance, one or more of the polyether polyols may contain polymer chains of ethylene oxide and propylene oxide combined.

The first polyether polyol, the second polyether polyol, and the third polyether polyol can be prepared using known methods. For instance, the polyether polyols can be prepared via base-catalyzed oxyalkylation. For base-catalyzed oxyalkylation, a hydric low molecular weight starter molecule, such as propylene glycol or glycerine, or sorbitol can be reacted with one or more alkylene oxides; such as ethylene oxide or propylene oxide, to form a polyether polyol, e.g., first polyether polyol, the second polyether polyol, and the third polyether polyol. Another manufacturing method can utilize DMC catalysis. Among the processes that may be utilized to prepare the first polyether polyol, the second polyether polyol, and the third polyether polyol, are those discussed in U.S. Pat. Nos. 3,728,308; 5,158,922; 5,470,813; 5,689,012; 6,077,978; and 7,919,575, among others. The first polyether polyol, the second polyether polyol, and the third polyether polyol, may be obtained commercially, such as under the trade names VORANOL™, TERCAROL™, VORALUX™, and SPECFLEX™, available from The Dow Chemical Company, among others.

Embodiments of the present disclosure provide that the polyether polyol compositions can have an average nominal hydroxyl functionality from 3.05 to 4.1. For instance, polyether polyols, which form a polyether polyol composition, can have a combined nominal hydroxyl functionality from 3.05 to 4.1.

Embodiments of the present disclosure provide that the polyether polyol compositions can have a total number average equivalent weight from 250 to 400. For instance, the polyether polyols, which form a polyether polyol composition, can have a combined number average equivalent weight from 250 to 400. All individual values and subranges from 250 to 400 are included; for example, the polyether polyol compositions can have a total number average equivalent weight from a lower limit of 250, 255, or 260 to an upper limit of 400, 380, or 360.

Embodiments of the present disclosure provide that the polyether polyol compositions can be from 20 weight percent to 50 weight percent of constitutional units derived from ethylene oxide. For instance, the polyether polyols, which form a polyether polyol composition, can have constitutional units derived from ethylene oxide that sum to from 20 weight percent to 50 weight percent of a total weight of the polyether polyol composition. All individual values and subranges from 20 weight percent to 50 weight percent of constitutional units derived from ethylene oxide are included; for example, the polyether polyol compositions can be from a lower limit of 20 weight percent, 23 weight percent, or 25 weight percent to an upper limit of 50 weight percent, 47 weight percent, or 45 weight percent of constitutional units derived from ethylene oxide. Embodiments of the present disclosure provide that the polyether polyol compositions can be from 50 weight percent to 80 weight percent of constitutional units derived from propylene oxide. All individual values and subranges from 50 weight percent to 80 weight percent of constitutional units derived from propylene oxide are included; for example, the polyether polyol compositions can be from a lower limit of 50 weight percent, 53 weight percent, or 55 weight percent to an upper limit of 80 weight percent, 77 weight percent, or 75 weight percent of constitutional units derived from propylene oxide.

The polyether polyol compositions disclosed herein are formed from polyols, e.g., the first polyether polyol, the second polyether polyol, and the third polyether polyol. For instance, the first polyether polyol, the second polyether polyol, and the third polyether polyol can be blended with one another. Blending can be done prior to foaming or can be carried out on line, for instance through a static mixer. Embodiments of the present disclosure provide that the polyether polyol compositions can include a total of 100 parts polyol, e.g. a combination of the first polyether polyol, the second polyether polyol, and the third polyether polyol totals 100 parts.

Embodiments of the present disclosure provide that the first polyether polyol can be from 10 parts to 60 parts per 100 parts of a combination of the first polyether polyol, the second polyether polyol, and the third polyether polyol. All individual values and subranges from 10 parts to 60 parts are included; for example, the first polyether polyol can be from a lower limit of 10 parts, 12 parts, or 15 parts to an upper limit of 60 parts, 57 parts, or 55 parts per 100 parts of the combination of the first, the second, and the third polyether polyols.

Embodiments of the present disclosure provide that the second polyether polyol can be from 3 parts to 40 parts per 100 parts of the combination of first, the second, and the third polyether polyols. All individual values and subranges from 3 parts to 40 parts are included; for example, the second polyether polyol can be from a lower limit of 3 parts, 5 parts, or 7 parts to an upper limit of 40 parts, 37 parts, or 35 parts per 100 parts of the combination of the first, the second, and the third polyether polyols.

Embodiments of the present disclosure provide that the third polyether polyol can be from 30 parts to 70 parts per 100 parts of the combination of first, the second, and the third polyether polyols. All individual values and subranges from 30 parts to 70 parts are included; for example, the third polyether polyol can be from a lower limit of 30 parts, 33 parts, or 35 parts to an upper limit of 70 parts, 67 parts, or 65 parts per 100 parts of the combination of the first, the second, and the third polyether polyols.

Some embodiments of the present disclosure provide that one or more of the polyether polyols of polyether polyol compositions disclosed herein can include a SAN or styrene and acrylonitrile polymer, or PHD or polyurea polymer, for instance. Such polymer polyols may be useful to open foam cells and/or to increase foam load bearing.

The polyether polyol compositions disclosed herein can be included in semi-rigid foam formulations, e.g. foam formulations that can be cured to semi-rigid foams, e.g. having a number of viscoelastic properties. Semi-rigid foam formulations, as disclosed herein can include an isocyanate, with the provisio that the isocyanate is not toluene diisocyanate.

Some embodiments of the present disclosure provide that the isocyanate is a polyisocyanate. As used herein, "polyisocyanate" refers to a molecule having an average of greater than 1.0 isocyanate groups per molecule.

Examples of polyisocyanates include, but are not limited to, alkylene diisocyanates such as 1,12-dodecane diisocyanate; 2-ethyltetramethylene 1,4-diisocyanate; 2-methyl-pentamethylene 1,5-diisocyanate; 2-ethyl-2-butylpentamethylene 1,5-diisocyanate; tetramethylene 1,4-diisocyanate; and hexamethylene 1,6-diisocyanate. Examples of polyisocyanates include, but are not limited to cycloaliphatic diisocyanates, such as cyclohexane 1,3- and 1,4-diisocyanate and mixtures of these isomers; 1-isocyanato-3,3,5-trimethyl-5-isocyanato-methylcyclohexane; 2,4- and 2,6-hexahydrotolylene diisocyanate; and the corresponding isomer mixtures, 4,4'-, 2,2'- and 2,4'-dicyclohexylmethane diisocyanate; and corresponding isomer mixtures. Examples of polyisocyanates include, but are not limited to, araliphatic diisocyanates, such as 1,4-xylylene diisocyanate and xylylene diisocyanate isomer mixtures. Examples of polyisocyanates include, but are not limited to, aromatic polyisocyanates, e.g., 4,4'-, 2,4'- and 2,2'-diphenylmethane diisocyanate and the corresponding isomer mixtures, mixtures of 4,4'- and 2,4'-diphenylmethane diisocyanates, polyphenyl-polymethylene polyisocyanates, mixtures of 4,4'-, 2,4'- and 2,2'-diphenylmethane diisocyanates and polyphenyl-polymethylene polyisocyanates (crude MDI). The polyisocyanate may be employed individually or in combinations thereof. Isocyanate prepolymers, i.e. isocyanates prereacted with a part of a polether polyol blend, or with a different polyol, can also be used. Also, modified isocyanates, e.g., isocyanates modified through trimerization, biuret and/or allophanate reactions for instance, may be utilized.

Some embodiments of the present disclosure provide that toluene diisocyanate is not utilized. For instance, utilizing toluene diisocyanate may provide a foam having a number of undesirable properties, such as being too soft.

The isocyanate can be prepared by phosgenation of corresponding polyamines with formation of polycarbamoyl chlorides and thermolysis thereof to provide the polyisocyanate and hydrogen chloride, or by a phosgene-free process, such as by reacting the corresponding polyamines with urea and alcohol to give polycarbamates, and thermolysis thereof to give the polyisocyanate and alcohol, for example. The isocyanate may be obtained commercially. Examples of commercial isocyanates include, but are not limited to, isocyanates sold under the trade names VORANATE™ and ISONATE™, available from The Dow Chemical Company.

Embodiments of the present disclosure provide that the isocyanate can have an average isocyanate functionality from 2.1 to 3.2. All individual values and subranges from 2.1 to 3.2 are included; for example, the isocyanate can have an average isocyanate functionality from a lower limit of 2.1, 2.2, or 2.3 to an upper limit of 3.2, 3.0, or 2.8.

Embodiments of the present disclosure provide that the isocyanate can have a number average isocyanate equivalent weight from 100 to 160. All individual values and subranges from 100 to 160 are included; for example, the isocyanate can have a number average isocyanate equivalent weight from a lower limit of 100, 105, or 110 to an upper limit of 160, 155, or 150.

The isocyanate can be utilized such that the semi-rigid foam formulation has an isocyanate index in a range from 70 to 105. Isocyanate index can be defined as a quotient, multiplied by one hundred, of an actual amount of isocyanate utilized and a theoretical amount of isocyanate for curing. All individual values and subranges from 70 to 105 are included; for example, the semi-rigid foam formulation can have an isocyanate index from a lower limit of 70, 75, or 80 to an upper limit of 105, 103, or 100.

The semi-rigid foam formulations can include a blowing agent. The blowing agent can be a physical blowing agent, a chemical blowing agent, or combinations thereof.

Physical blowing agents can be utilized to help foam the semi-rigid foam formulations. Examples of physical blowing agents include liquid carbon dioxide; alkanes; cycloalkanes, such as, cyclopentane, cyclohexane, cyclobutane and mixtures thereof; other cycloalkanes having a maximum of 4 carbon atoms; dialkyl ethers, cycloalkylene ethers, fluoroalkanes, and mixtures thereof. Examples of alkanes include propane, n-butane, isobutane, isopentane and mixtures thereof. Examples of dialkyl ethers include dimethyl ether, methyl ethyl ether, methyl butyl ether, diethyl ether, and combinations thereof. An example of a cycloalkylene ether is furan. Examples of fluoroalkanes include trifluoromethane, difluoromethane, difluoroethane, tetrafluoroethane, hepta-fluoropropane, and combinations thereof.

Some embodiments of the present disclosure provide that the physical blowing agent, when utilized, can be from 0.5 parts to 15.0 parts per 100 parts of a combination of the first polyether polyol, the second polyether polyol, and the third polyether polyol. All individual values and subranges from 0.5 parts to 10.0 parts are included; for example, the physical blowing agent can be from a lower limit of 0.5, 1.0, or 2.0 parts to an upper limit of 15.0, 13.0, or 10.0 parts of a combination of the first polyether polyol, the second polyether polyol, and the third polyether polyol.

Chemical blowing agents can be utilized to form carbon dioxide from a reaction with the polyisocyanate, for instance. An example the chemical blowing agent is water. Some embodiments of the present disclosure provide that the chemical blowing agent, when utilized, is from 0.5 parts to 5.0 parts per 100 parts of a combination of the first polyether polyol, the second polyether polyol, and the third polyether polyol. All individual values and subranges from 0.5 parts to 5.0 parts are included; for example, the chemical blowing agent can be from a lower limit of 0.5, 0.6, or 0.7 parts to an upper limit of 5.0, 4.8, or 4.6 parts per 100 parts of a combination of the first polyether polyol, the second polyether polyol, and the third polyether polyol. Some embodiments of the present disclosure provide that carbon dioxide may also be utilized via adducts of carbon dioxide, such as carbamates, which may be added to the semi-rigid foam formulations.

The semi-rigid foam formulations can include a surfactant. The surfactant may help to emulsify components of the semi-rigid foam formulation, regulate cell size of a resultant foam, and/or stabilize a cell structure to help prevent collapse and/or sub-surface voids. Examples of surfactants include silicon-based compounds such as silicone oils and organosilicone-polyether copolymers, such as polydimethyl siloxane and polydimethylsiloxane-polyoxyalkylene block copolymers, e.g., polyether modified polydimethyl siloxane, and combinations thereof. Examples of surfactants include silica particles and silica aerogel powders, as well as organic surfactants such as nonylphenol ethoxylates. Surfactants are available commercially and include those available under trade names such as NIAX™, DABCO™, and TEGOSTAB™, among others. Some embodiments of the present disclosure provide that surfactant, when utilized, is from 0.1 parts to 1.5 parts per 100 parts of a combination of the first polyether polyol, the second polyether polyol, and the third polyether polyol. All individual values and subranges from 0.1 parts to 1.5 parts are included; for example, the surfactant can be from a lower limit of 0.1, 0.2, or 0.3 parts to an upper limit of 1.5, 1.3, or 1.0 per 100 parts of a combination of the first polyether polyol, the second polyether polyol, and the third polyether polyol.

The semi-rigid foam formulations can include a catalyst. The catalyst can be an amine catalyst, a metallic catalyst, and combinations thereof. Examples of amine catalysts include pentamethyldiethylene-triamine, triethylamine, tributyl amine, dimethyl ethanolamine, N,N,N',N'-tetramethylethylenediamine, dimethylbenzylamine, N,N,N',N'-tetramethylbutanediamine, dimethylcyclohexylamine, triethylenediamine, and combinations thereof, among others. Examples of metallic catalysts include tin(II) salts of organic carboxylic acids, e.g., tin(II) diacetate, tin(II) dioctanoate, tin(II) diethylhexanoate, stannous octoate, and tin(II) dilaurate, and dialkyltin(IV) salts of organic carboxylic acids, e.g., dibutyltin diacetate, dibutyltin dilaurate, dibutyltin maleate and dioctyltin diacetate, and combinations thereof, among others. Catalysts are available commercially and include those available under trade names such as NIAX™ POLYCAT™, and DABCO™, among others. Some embodiments of the present disclosure provide that the catalyst can be a combination of at least one amine and a metal salt. Some embodiments of the present disclosure provide that reactive amine catalysts, such as dimethylethanolamine (DMEA) and/or N,N-dimethylainopropylamine (DMAPA) and preferably an amine initiated polyol, such as Dow s VORACTIV™ or SPECFLEX ACTIV™ polyol, can be used to reduce or eliminate amine based VOC s or Volatile Organic Compounds, for example.

Some embodiments of the present disclosure provide that catalyst is from 0.04 parts to 5.00 parts per 100 parts of a combination of the first polyether polyol, the second polyether polyol, and the third polyether polyol. All individual values and subranges from 0.04 parts to 5.00 parts are included; for example, the catalyst can be from a lower limit of 0.04, 0.07, or 0.09 parts to an upper limit of 5.00, 3.50, or 2.00 parts per 100 parts of a combination of the first polyether polyol, the second polyether polyol, and the third polyether polyol.

Some embodiments of the present disclosure provide that the semi-rigid foam formulations can include one or more additional components. Different additional components and/or different amounts of the additional components may be utilized for various applications. Examples of additional components include liquid and/or solid pigments, colorants, flame retardants, crosslinkers, fillers, chain extenders, antioxidants, surface modifiers, bioretardant agents, mold release agents, and combinations thereof, among others. Some embodiments of the present disclosure provide that crosslinkers and chain extenders are not utilized.

Semi-rigid foams disclosed herein can be prepared by curing, e.g. reacting, the semi-rigid foam formulations previously discussed. In contrast to previous semi-rigid foams, which have a high density and are usually made with a high functionality crosslinker, as discussed for instance in US 20130209778, or have closed cells, as described in WO 01/018087, for instance. Additionally as mentioned and in contrast to previous semi-rigid foams, the semi-rigid foams disclosed herein have a number of viscoelastic properties.

The semi-rigid foams disclosed herein can be prepared using known methods. These methods may include continuous or discontinuous free-rise slabstock foam processes and molded foam processes using a mixing head or a stirrer to blend components together with or without addition of air, for example. Output of the mixing head can be deposited onto a conveyor or to a mold. For slabstock process, the semi-rigid foam can expand further and rises as it moves down the conveyor, forming a continuous semi-rigid foam slab that can be cut into blocks or buns of a desired length for further curing and/or storage and subsequent slicing. In a discontinuous process, the semi-rigid foam formulation can be mixed through a head and poured into a container. A variable pressure foaming (VPF) process, as described in U.S. Pat. No. 5,194,453, can be utilized.

A molded foam process can employs a one-shot approach in which a specific amount of the isocyanate is combined and mixed with a specific amount of the remaining semi-rigid foam formulation components to form a mixture. The mixture can deposited as a froth into a mold that is then closed. The foam can expand to fill the mold, which is subsequently opened for demolding after a curing time. The curing time can be between 1 and 20 minutes, for example.

The semi-rigid foam can have an irregular cell size structure with open cells, e.g., with broken windows. Preferably the linear cell count is below 40 cells per centimeter. Very fine cells may provide a tight foam and may utilize a silicone surfactant adjustment, either using a different type or and changing concentration, for instance.

As mentioned, for some applications it is desirable for a semi-rigid foam to have a compression load deflection at 40% of from 3.5 kilopascals to 30.0 kilopascals as measured according to ISO 3386, with the proviso that hardness is measured during a first cycle. Measuring the foam hardness at a first cycle is utilized because the semi-rigid foams disclosed herein can have a recovery time higher than 3 seconds, e.g., up to 200 seconds. Hence, semi-rigid foam samples may not regain their initial thickness fast enough after the first compression cycle to give a meaningful and comparable value of foam hardness with subsequent cycles as per the standard test method.

The semi-rigid foams disclosed herein can have a compression load deflection at 40% as measured according to ISO 3386, with the proviso that hardness is measured during a first cycle from 3.5 kilopascals to 30.0 kilopascals. All individual values and subranges from 3.5 kilopascals to 30.0 kilopascals are included; for example, the semi-rigid foams can have a compression load deflection at 40% as measured according to ISO 3386, with the proviso that hardness is measured during a first cycle from a lower limit of 3.5 kilopascals, 3.7 kilopascals, or 3.9 kilopascals to an upper limit of 30 kilopascals, 28 kilopascals, or 25 kilopascals.

The semi-rigid foams disclosed herein can have a density, measured according to ISO 845-88, from 35 kg/m$^3$ to 80 kg/m$^3$. All individual values and subranges from 35 kg/m$^3$ to 80 kg/m$^3$ are included; for example, the semi-rigid foams can have a density from a lower limit of 35 kg/m$^3$, 37 kg/m$^3$, or 40 kg/m$^3$ to an upper limit of 80 kg/m$^3$, 75 kg/m$^3$, or 70 kg/m$^3$. Advantageously the semi-rigid foams disclosed herein may be utilized for low density applications. For example, for a number of applications, it is desirable for the density to be less than 90 kg/m$^3$.

The semi-rigid foams disclosed herein can have an uncrushed airflow, measured according to ASTM D 3574, from 0.01 ft$^3$/min to 10.00 ft$^3$/min. All individual values and subranges from 0.01 ft$^3$/min to 10.00 ft$^3$/min are included; for example, the semi-rigid foams can have an uncrushed airflow from a lower limit of 0.01 ft$^3$/min, 0.02 ft$^3$/min, or 0.03 ft$^3$/min to an upper limit of 10.00 ft$^3$/min, 9.00 ft$^3$/min, or 8.00 ft$^3$/min. As previously mentioned, the semi-rigid foams can include open cells, hence, for various applications, uncrushed airflow values above 0.05 ft$^3$/min are preferred.

The semi-rigid foams disclosed herein can have a resiliency, measured according to ASTM D 3574, from 2 percent to 20 percent. All individual values and subranges from 2 percent to 20 percent are included; for example, the semi-rigid foams can have a resiliency from a lower limit of 2 percent or 3 percent to an upper limit of 20 percent or 16 percent.

The semi-rigid foams disclosed herein can have a 95% foam recovery time, measured according to a modified IKEA test method NO IOS MAT 006 using RESIMAT 100 testing equipment from 3 seconds to 200 seconds. All individual values and subranges from 3 seconds to 200 seconds are included; for example, the semi-rigid foams can have a 95% foam recovery time from a lower limit of 3 seconds, 3.5 seconds, or 4 seconds to an upper limit of 200 seconds, 2150 seconds, or 120 seconds. The semi-rigid foams disclosed herein can have a 90% dry compression, measured according to ISO 1856, below 5 percent and a 70% wet compression set, measured according to ISO 13362, below 5.0 percent. All individual values and subranges from 0.0 percent to 5.0 percent are included; for example, the semi-rigid foams can have a compression set from a lower limit of 0.0 percent, 0.1 percent, or 0.2 percent to an upper limit of 5.0 percent, 4.8 percent, or 4.5 percent.

A low value of compression set, e.g. a value below 5 percent, indicates that the semi-rigid foam recovers at least 95% of its initial thickness within a particular time limit. This indicates that the semi-rigid foam has a proper durability for use in bedding and furniture, although the recovery time can be delayed up to 200 seconds.

The semi-rigid foams disclosed herein can have at least one glass transition temperature from 0° C. to 90° C. All individual values and subranges from 0° C. to 90° C. are included.

EXAMPLES

In the Examples, various terms and designations for materials are used including, for instance, the following:

Polyether polyol #1A (polyol with nominal hydroxyl functionality of 3 and a number average equivalent weight of 1180, 7% EO, available from The Dow Chemical Company); polyether polyol #1B (polyol with nominal hydroxyl functionality of 3 and a number average equivalent weight of 1000, 0% EO, available from The Dow Chemical Company); polyether polyol #1C (polyol with nominal hydroxyl functionality of 3 and a number average equivalent weight of 237, 0% EO, available from The Dow Chemical Company); polyether polyol #1D (polyol with nominal hydroxyl functionality of 3 and a number average equivalent weight of 360, 0% EO, available from The Dow Chemical Company); polyether polyol #2 (polyol with nominal hydroxyl functionality of 4.7 and a number average equivalent weight of 156, 0% EO, available from The Dow Chemical Company); polyether polyol #3 (polyol with nominal hydroxyl functionality of 3 and a number average equivalent weight of 336, 60% EO mixed feed with PO, available from The Dow Chemical Company); NIAX™ A1 (amine catalyst, available from Momentive Performance Materials Inc.); DABCO® 33LV (amine catalyst, available from Air Products & Chemicals Inc.); DABCO® T-9 (metallic catalyst, available from Air Products & Chemicals Inc.); NIAX™ L-620 (surfactant, available from Momentive Performance Materials Inc.); isocyanate (polymeric diphenylmethane diisocyanate having a number average isocyanate equivalent weight of 130 and an average isocyanate functionality of 2.3).

Example 1, a polyether polyol composition, was prepared by combing polyether polyol #1A, polyether polyol #2, and polyether polyol #3. The relative amounts are shown in Table 1. Examples 2-14 and Comparative Examples A-D were prepared as Example 1, with any changes of polyether polyol and/or relative amounts as indicated in Table 1.

TABLE 1

| Polyether polyol composition | Polyether polyol #1A (parts) | Polyether polyol #1B (parts) | Polyether polyol #1C (parts) | Polyether polyol #1D (parts) | Polyether polyol #2 (parts) | Polyether polyol #3 (parts) |
|---|---|---|---|---|---|---|
| Example 1 | 25 | — | — | — | 10 | 65 |
| Example 2 | 15 | — | — | — | 20 | 65 |
| Example 3 | 20 | — | — | — | 20 | 60 |
| Example 4 | 25 | — | — | — | 20 | 55 |
| Example 5 | 30 | — | — | — | 20 | 50 |
| Example 6 | 12 | — | 18 | — | 5 | 65 |
| Example 7 | 15.5 | — | 24.5 | — | 5 | 55 |
| Example 8 | 19 | — | 31 | — | 5 | 45 |
| Example 9 | 15 | — | 10 | — | 10 | 65 |
| Example 10 | 19 | — | 16 | — | 10 | 55 |
| Example 11 | 22.5 | — | 22.5 | — | 10 | 45 |
| Example 12 | — | 15 | 10 | — | 10 | 65 |
| Example 13 | — | 19 | 16 | — | 10 | 55 |
| Example 14 | — | 22.5 | 22.5 | — | 10 | 45 |
| Comparative Example A | 20 | — | — | 20 | — | 60 |
| Comparative Example B | 25 | — | 20 | — | — | 55 |
| Comparative Example C | 30 | — | 15 | — | — | 55 |
| Comparative Example D | — | 20 | 20 | — | — | 60 |

Overall nominal hydroxyl functionality of Examples 1-14 and Comparative Examples A-D, overall weight percent of constitutional units derived from ethylene oxide of Examples 1-14 and Comparative Examples A-D, and overall number average equivalent weight of Examples 1-14 and Comparative Examples A-D were calculated, the results are shown in Table 2.

TABLE 2

| Polyether polyol composition | Overall nominal hydroxyl functionality | Overall weight percent of constitutional units derived from ethylene oxide | Overall number average equivalent weight |
|---|---|---|---|
| Example 1 | 3.17 | 40.8 | 357 |
| Example 2 | 3.34 | 40.8 | 298 |
| Example 3 | 3.34 | 38.4 | 308 |
| Example 4 | 3.34 | 36.0 | 318 |
| Example 5 | 3.34 | 33.6 | 329 |
| Example 6 | 3.09 | 40.4 | 319 |
| Example 7 | 3.09 | 34.9 | 318 |
| Example 8 | 3.09 | 29.3 | 318 |
| Example 9 | 3.17 | 40.8 | 315 |
| Example 10 | 3.17 | 35.3 | 320 |
| Example 11 | 3.17 | 29.7 | 319 |
| Example 12 | 3.17 | 39.0 | 317 |
| Example 13 | 3.17 | 33.0 | 317 |
| Example 14 | 3.17 | 27.0 | 317 |
| Comparative Example A | 3.00 | 38.4 | 396 |
| Comparative Example B | 3.00 | 36.0 | 370 |
| Comparative Example C | 3.00 | 36.0 | 394 |
| Comparative Example D | 3.00 | 36.0 | 350 |

Example 15, a semi-rigid foam formulation, was prepared by combining the polyether polyols of Example 1 with components as indicated in Table 3. Example 15 was prepared at approximately 22° C. To prepare Example 15 based upon 270 grams of total polyether polyol blend, all components except the isocyanate were added to a container and stirred for 30 seconds, after which the isocyanate was added to the contents of the container, which were stirred for an additional 30 seconds with a bench scale static mixer at approximately 1,800 RPM. Examples 16 to-25 and Comparative Examples E to H were prepared as Example 15, with any changes indicated in Table 3.

Example 26, a semi-rigid foam, was formed by curing Example 12. To form Example 26, Example 12 was poured into an open top container and allowed to rise and cure for approximately 5 minutes at approximately 22° C., thereafter annealed in an oven for approximately 5 minutes at 150° C., and then removed from the oven and left uncovered for approximately 24 hours at approximately 22° C. in a ventilated area. Example 27 to-39 and Comparative Examples I to L were formed as Example 26, with the change that Examples 13 to-25 and Comparative Examples E to H respectively replaced Example 12.

TABLE 3

| Semi-rigid foam formulation | Polyether polyol composition | NIAX ™ A1 catalyst (parts) | DABCO ® 33LV catalyst (parts) | DABCO ® T-9 catalyst (parts) | NIAX ™ L-620 surfactant (parts) | Water (parts) | Isocyanate (isocyanate index) | Semi-rigid foam |
|---|---|---|---|---|---|---|---|---|
| Example 12 | Example 1 | 0.15 | 0.05 | 0.06 | 0.80 | 2.00 | 82 | Example 26 |

TABLE 3-continued

| Semi-rigid foam formulation | Polyether polyol composition | NIAX™ A1 catalyst (parts) | DABCO® 33LV catalyst (parts) | DABCO® T-9 catalyst (parts) | NIAX™ L-620 surfactant (parts) | Water (parts) | Isocyanate (isocyanate index) | Semi-rigid foam |
|---|---|---|---|---|---|---|---|---|
| Example 13 | Example 2 | 0.15 | 0.05 | 0.06 | 0.80 | 2.00 | 82 | Example 27 |
| Example 14 | Example 3 | 0.15 | 0.05 | 0.06 | 0.80 | 2.00 | 82 | Example 28 |
| Example 15 | Example 4 | 0.15 | 0.05 | 0.06 | 0.80 | 2.00 | 82 | Example 29 |
| Example 16 | Example 5 | 0.15 | 0.05 | 0.06 | 0.80 | 2.00 | 82 | Example 30 |
| Example 17 | Example 6 | 0.15 | 0.05 | 0.04 | 0.80 | 2.00 | 82 | Example 31 |
| Example 18 | Example 7 | 0.15 | 0.05 | 0.06 | 0.80 | 2.00 | 82 | Example 32 |
| Example 19 | Example 8 | 0.15 | 0.05 | 0.06 | 0.80 | 2.00 | 82 | Example 33 |
| Example 20 | Example 9 | 0.15 | 0.05 | 0.06 | 0.80 | 2.00 | 82 | Example 34 |
| Example 21 | Example 10 | 0.15 | 0.05 | 0.06 | 0.80 | 2.00 | 82 | Example 35 |
| Example 22 | Example 11 | 0.15 | 0.05 | 0.04 | 0.80 | 2.00 | 82 | Example 36 |
| Example 23 | Example 12 | 0.15 | 0.05 | 0.06 | 0.80 | 2.00 | 82 | Example 37 |
| Example 24 | Example 13 | 0.15 | 0.05 | 0.06 | 0.80 | 2.00 | 82 | Example 38 |
| Example 25 | Example 14 | 0.15 | 0.05 | 0.04 | 0.80 | 2.00 | 82 | Example 39 |
| Comparative Example E | Comparative Example A | 0.15 | 0.05 | 0.06 | 0.80 | 2.00 | 82 | Comparative Example I |
| Comparative Example F | Comparative Example B | 0.15 | 0.05 | 0.06 | 0.80 | 2.00 | 82 | Comparative Example J |
| Comparative Example G | Comparative Example C | 0.15 | 0.05 | 0.06 | 0.80 | 2.00 | 82 | Comparative Example K |
| Comparative Example H | Comparative Example D | 0.15 | 0.05 | 0.06 | 0.80 | 2.00 | 82 | Comparative Example L |

Various foam properties were determined for a number of the Examples and/or Comparative Examples discussed herein. The properties were determined at 22° C. and 50 percent relative humidity.

Density was measured according to ISO 845-88; uncrushed airflow was measured according to ASTM D 3574, uncrushed means that foam samples were not compressed before airflow testing to leave the cell windows intact, as they were after foaming and curing; resiliency was measured according to ASTM D 3574; 90% dry compression set was measured according to ISO 1856-00; and wet compression set was measured according to ISO 13362. Results are reported in Table 4.

TABLE 4

| Semi-rigid foam | Density (kg/m$^3$) | Uncrushed airflow (ft$^3$/min) | Resiliency (%) | 90% dry compression set (%) | Wet compression set (%) |
|---|---|---|---|---|---|
| Example 26 | 53.0 | 1.2 | 5 | 0.0 | 0.0 |
| Example 27 | 48.2 | 1.9 | 5 | 1.2 | 0.0 |
| Example 28 | 47.1 | 2.7 | 8 | 0.5 | 0.0 |
| Example 29 | 46.7 | 4.0 | 12 | 1.3 | 1.9 |
| Example 30 | 45.8 | 3.8 | 13 | 0.2 | 0.0 |
| Example 31 | 50.0 | 1.5 | 3 | 2.9 | 0.0 |
| Example 32 | 49.2 | 0.05 | 4 | 3.5 | 0.0 |
| Example 33 | 46.9 | 0.05 | 9 | 1.3 | 1.9 |
| Example 34 | 48.5 | 1.4 | 4 | 0.0 | 0.0 |
| Example 35 | 46.8 | 1.4 | 5 | 1.0 | 0.0 |
| Example 36 | 47.3 | 0.08 | 7 | 1.9 | 0.0 |
| Example 37 | 51.3 | 2.4 | 5 | 0.1 | 0.0 |
| Example 38 | 50.7 | 2.7 | 6 | 0.8 | 0.0 |
| Example 39 | 48.3 | 3.8 | 10 | 0.2 | 0.0 |
| Comparative Example I | 51.2 | 1.9 | 3 | 0.0 | 0.0 |
| Comparative Example J | 50.5 | 1.8 | 3 | 1.6 | 0.0 |
| Comparative Example K | 51.1 | 2.3 | 4 | 1.6 | 0.0 |
| Comparative Example L | 51.1 | 3.9 | 3 | 0.5 | 0.0 |

The data of Table 4 indicates desirable foam properties for each of Examples 26 to 39, since the loss of thickness of the foam samples after accelerated aging is very low for each of these semi-rigid foams. Surprisingly, the desirable resistance to both dry and humid aging is obtained while resiliency is low. Additionally, as indicated by the data of Table 4, foam airflows are not negatively impacted by the use of a high polyol functionality. Such polyol combinations, with overall functionality above 3.0, may be expected to close foam cells though a fast viscosity buildup of the reactants during foaming.

Foam compression load deflection at 40% was measured according to ISO 3386, with the proviso that hardness was recorded during a first cycle; results are reported in Table 5.

95% foam recovery times were determined according to a modified IKEA test method. A test sample with the dimensions 100×100×50 mm was compressed vertically to 75% compression by means of a pressure plate onto a reference surface. At the 75% compression four clamps fixed the pressure plate and keep the strain for a hold time of 60 seconds. After the hold time, the clamps were loosened to instantly release the foam sample, which gradually recovered from the deformation regaining its original shape. An ultrasonic sensor positioned directly above the pressure plate continuously recorded the kinetics of the foam sample surface. A thickness vs time curve was used to determine the time to regain 95% of original height. Because the modified IKEA test was stopped after 120 seconds visual observation was utilized after 120 seconds. Results are reported in Table 5.

TABLE 5

| Semi-rigid foam | Compression load deflection at 40% as measured according to ISO 3386, with the proviso that hardness was measured during a first cycle (kPa) | 95% foam recovery time: modified IKEA Test (s) |
| --- | --- | --- |
| Example 26 | 3.5 | — |
| Example 27 | 8.0 | 20 |
| Example 28 | 11.0 | 64 |
| Example 29 | 14.0 | >120 |
| Example 30 | 16.0 | >120 |
| Example 31 | 4.0 | 3 |
| Example 32 | 4.5 | 9 |
| Example 33 | 8.0 | 43 |
| Example 34 | 4.1 | 5 |
| Example 35 | 4.3 | 14 |
| Example 36 | 7.0 | 67 |
| Example 37 | 4.1 | 9 |
| Example 38 | 5.2 | 31 |
| Example 39 | 7.4 | 75 |
| Comparative Example I | 2.5 | 1 |
| Comparative Example J | 3.0 | 3 |
| Comparative Example L | 2.2 | 4 |

The data in Table 5 show that Examples 26 to 39 each have a compression load deflection at 40% as measured according to ISO 3386, with the proviso that hardness was measured during a first cycle, from 3.5 kPa to 16.0 kPa. In contrast to each of Examples 26 to 39, Comparative Examples I, J, and L each have compression load deflections at 40% as measured according to ISO 3386, with the proviso that hardness was measured during a first cycle, from 2.2 kPa to 3.0 kPa. Additionally, the data in Table 5 indicate a viscoelastic property of Examples 26 to 39. As indicated by the modified IKEA test results, the foam recovery times are long, even for foams having high airflow values. This indicates that the foams are indeed viscoelastic. A long recovery time may in part attributable to a pneumatic effect, i.e. when airflow is low and in-coming air takes time to get inside the cells during recovery after compression. In contrast to Examples 26 to 39, open foams, with airflows higher than 0.05 and up to 4.0 ft3/min do not provide a pneumatic behavior.

Glass transition temperatures were determined by dynamic mechanical thermal analysis (DMTA) utilizing Mettler Toledo DMA 861 equipment. Results are reported in Table 6.

TABLE 6

| Semi-rigid foam | Glass transition temperature (° C.) |
| --- | --- |
| Example 26 | 35 |
| Example 29 | 45 |
| Example 33 | 32 |

The data in Table 6 show that each of Examples 26, 29, and 33 each have a glass transition temperature, above the freezing point of water, which may be desirable for a number of applications.

What is claimed:

1. A polyether polyol composition comprising:

a first polyether polyol having an average nominal hydroxyl functionality from 2 to 4 and a number average equivalent weight from 120 to 1500, wherein the first polyether polyol includes a polymer chain having from 0 weight percent to 15 weight percent of constitutional units derived from ethylene oxide and 85 weight percent to 100 weight percent of constitutional units derived from propylene oxide;

a second polyether polyol having a having an average nominal hydroxyl functionality of 4.7 and a number average equivalent weight from 120 to 800, wherein the second polyether polyol includes a polypropylene oxide polymer chain and the second polyether polyol is formed with only one alkylene oxide, wherein the one alkylene oxide is propylene oxide; and a third polyether polyol having an average nominal hydroxyl functionality from 2 to 4 a number average equivalent weight from 200 to 500, wherein the third polyether polyol includes a polymer chain having from 30 weight percent to 85 weight percent of constitutional units derived from ethylene oxide and 15 weight percent to 70 weight percent of constitutional units derived from propylene oxide;

wherein the polyether polyol composition is from 20 weight percent to 50 weight percent of constitutional units derived from ethylene oxide, the polyether polyol composition has a total average nominal hydroxyl functionality from 3.05 to 4.1, and the polyether polyol composition has a total number average equivalent weight from 250 to 400, and wherein the first polyether polyol is from 15 parts to 55 parts; the second polyether polyol is from 7 parts to 35 parts per 100 parts; and the third polyether polyol is from 35 parts to 65 parts based upon a total of 100 parts polyol.

2. The polyether polyol composition of claim 1, wherein the first polyether polyol, and the third polyether polyol are nominally triols.

* * * * *